INVENTORS
Edwin L. Albright
Philip F. Catalano
BY Mason, Porter, Diller & Stewart
ATTORNEYS

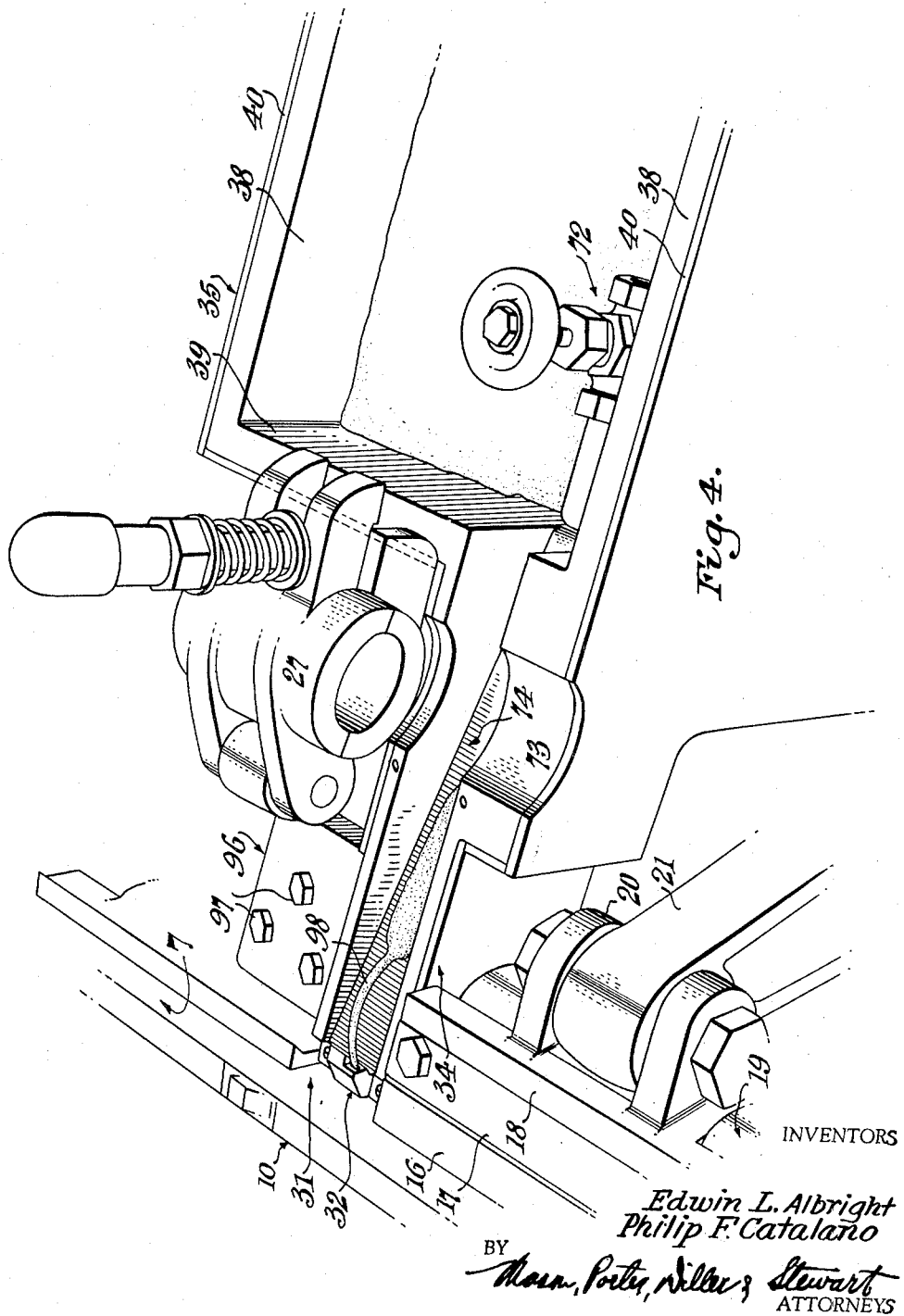

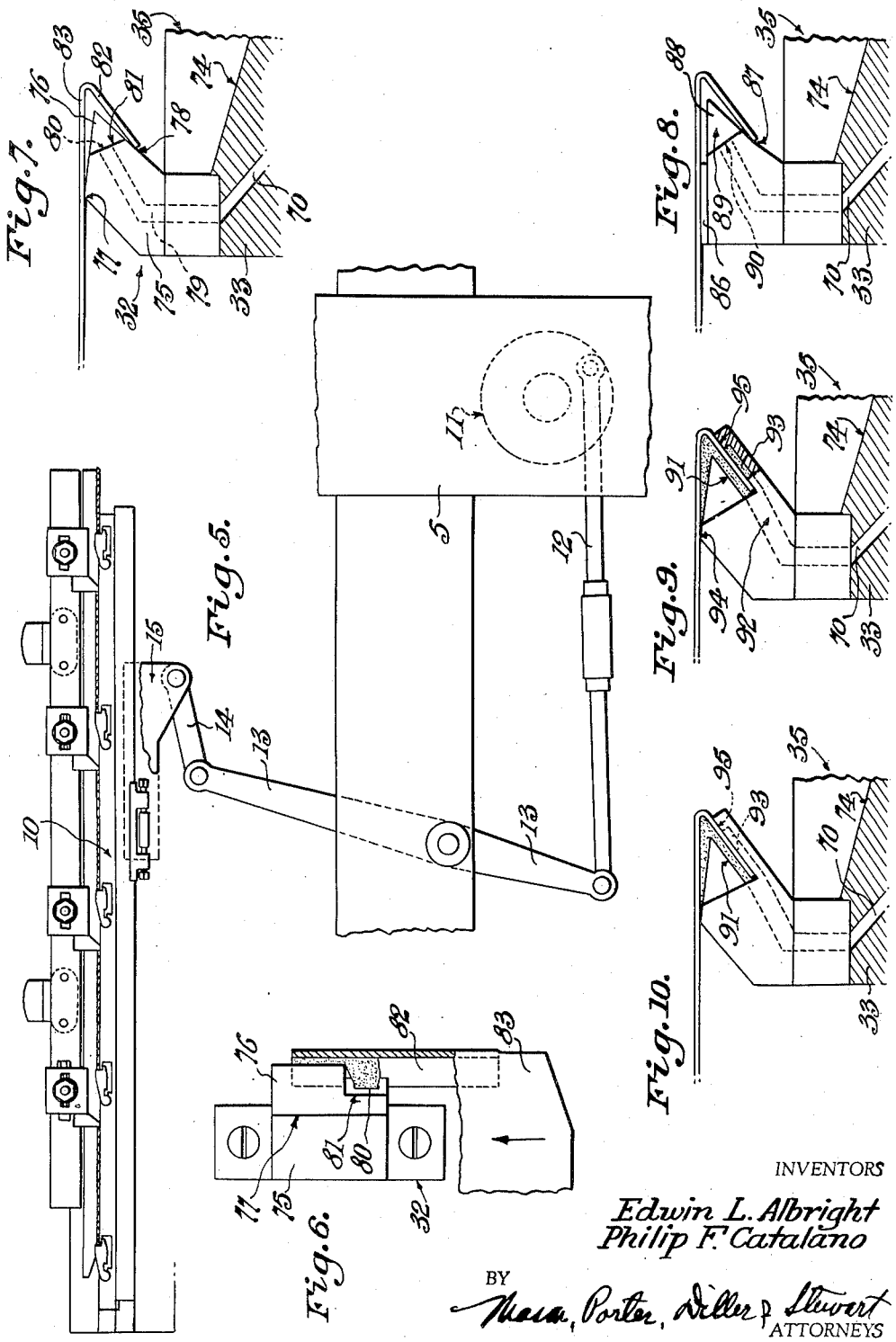

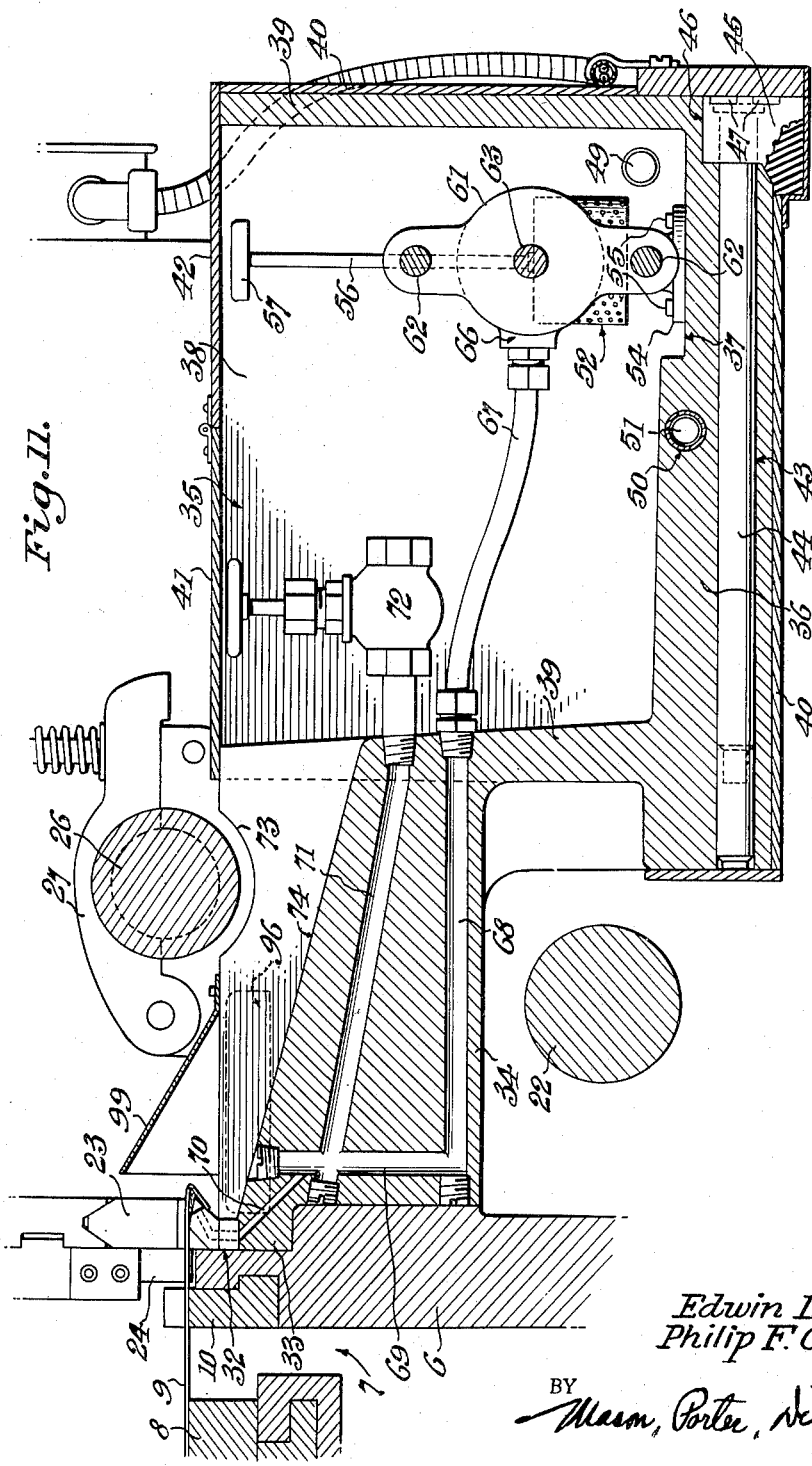

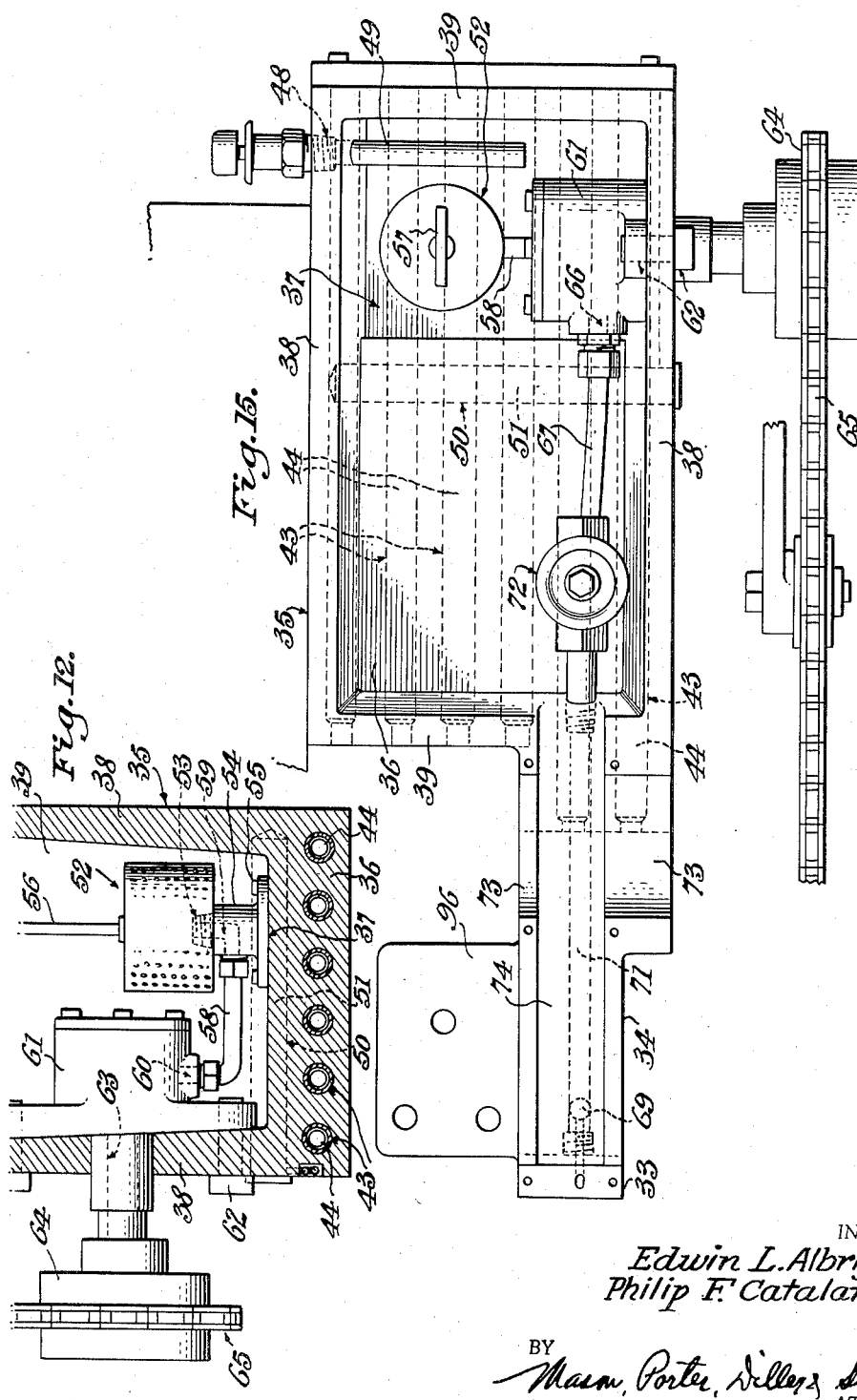

United States Patent Office 2,773,280
Patented Dec. 11, 1956

2,773,280

CONTAINER SIDE SEAM SEALING COMPOUND APPLYING APPARATUS AND METHOD

Edwin L. Albright, Glenview, and Philip F. Catalano, Chicago, Ill., assignors to Continental Can Company, Inc., New York, N. Y., a corporation of New York Application July 13, 1954, Serial No. 443,022

21 Claims. (Cl. 18—1)

The invention relates generally to the art of manufacturing metallic receptacles and primarily seeks to provide a novel means for accurately and efficiently applying a sealing compound or dope to portions of can blanks which are to engage in the formation of side seams, thereby to provide for a proper sealing of the side seams in the completion of the can bodies without resorting to the usual solder bonding.

It is quite common in the manufacture of can bodies to provide said bodies with lock and lap side seams, the lap portions of the seams being disposed at the end extremities thereof and having the purpose of presenting only two thicknesses of metal where the flanges must be turned at the ends of the bodies, and the lock portions of said seams being disposed over the major length of the bodies between the lap portions and being formed by the interlocking of hooks provided on the opposite ends of the can body blanks. It has been proposed heretofore to apply a sealing compound to the hook portions of body blanks preparatory to the formation of the side seams, but the practices of which we presently are aware have not been entirely satisfactory and are subject to much improvement. One such practice has been to apply the dope or sealing material to the hooks by engaging them in drag contact with an applicator wheel or roller having the material thereon. Another practice has been to project or squirt the material into a hook portion before the blank hooks are brought into interlocking engagement in the formation of the can body side seam. In such practices it has been found impossible, for many reasons, adequately and accurately to place the sealing compound throughout the full length of each interlocking seam structure.

The result has been that some seams would have an inadequate application of sealing compound at portions in the length thereof and hence would be leaky, and in other seam structures, in which an over abundance of sealing compound had been applied in an effort to assure adequacy throughout the full length of each seam, much of the compound would be extruded during the completion of the seams. This served not only to provide unsightly can bodies, but also to foul up operating parts in machine structures in which the operations were being performed. An object of the invention is to remedy these objectionable conditions by the provision of novel means operable to apply the sealing compound uniformly throughout the full length of each side seam, and in such quantity that no uncontrollable excess of sealing compound will be incorporated in any seam and there will be no bulging and opening of seams or the extrusion of sealing compound therefrom.

Another object of the invention is to provide in an apparatus of the character stated novel plow means engageable with sealing compound applied in a body blank seam hook portion, said plow means being effective to spread the sealing compound in just the right placement and quantity throughout the full length of said hook portion.

While the invention is not limited in practical application to incorporation in any single type of can body maker, it is well adapted to incorporation in body makers of the well known Troyer-Fox type which have developed from structures disclosed in U. S. Letters Patent to Troyer et al., 1,772,820, issued August 12, 1930. In this type of machine the body blanks are fed flatwise, station by station, along supporting ways, certain operations being performed thereon at the several stations. Among these are the well known notching, slitting and hook forming operations. The hook forming operations are performed in two stages, a first bending vertically out of the horizontal plane of the blanks at a first folding station, and a second bending laterally at a second folding station and to the proper angular relation of the hooks. The blanks thereafter pass to the forming station whereat they are shaped about a horn and have their hooks interlocked and bumped in the well known manner to complete the formation of the bodies, after which the solder bonding of the side seams thus formed usually is accomplished. In machines of the type referred to, the feeding of the can body blanks usually is accomplished by feed bars reciprocated horizontally by a rocking lever to which motion is imparted by a pitman connected with a rotated crank pin. By this means an harmonic motion is imparted to the blanks, there being a relatively rapid movement over the mid portion of each feed stroke, a gradually accelerating movement at the start of each feed stroke and a gradually decelerating movement toward the end of each stroke because of the transferring of the circular motion of the crank pin into a straight line reciprocation of the feed bars, indirectly through the pitman and rocker arm connections. This rapid movement of the can body blanks in the central portion of the feed stroke, and the relatively slower speed of movement thereof near the starting and ending of each feed stroke have greatly accentuated the problems experienced in the past in attempts uniformly to apply a sealing compound to a hook on a can body blank while it is being fed along in a body maker. It is therefore an object of the present invention to provide novel means for applying a sealing compound to a can body blank hook while the blank is being fed along in a body maker of the type stated, and accurately and evenly distributing the same so that there will be neither uncontrollable surplus or leak providing partial inadequacy of the application despite the harmonic motion imparted to the blank in the feeding thereof.

Another object of the invention is to provide an apparatus of the character stated wherein there are included a stationary distributor nozzle past which the blanks are fed and including a delivery orifice through which the sealing compound is directed into the passing hook of a can body blank, and a plow disposed beside the orifice in position to engage the applied sealing compound and spread the same uniformly throughout the full length of the hook.

Another object of the invention is to provide in an apparatus of the character stated a sealing compound spreader plow so shaped with relation to the hook wherein the compound is being applied as to contact with the hook and accurately define the width and depth of the application so that there will be no substantial extrusion of sealing compound from the ultimately formed can body side seam, and yet all portions of said seam will include sealing compound fully adequate for the provision of a wholly leakproof seam.

Another object of the invention is to provide an apparatus of the character stated including a reservoir, means for maintaining a hot melt sealing compound in fluid state therein, means for continuously directing a stream of the compound across the path of travelling can body hooks so that the compound will be applied in each passing hook, and means for receiving sealing compound directed through the spaces between travelling blanks and returning the same to the reservoir.

Another object of the invention is to provide an apparatus of the character stated wherein there are included a by-pass duct leading away from and returning to the reservoir and communicating with the sealing compound delivery orifice, pump means for continuously forcing sealing compound through the by-pass and the orifice, and means for variably choking the by-pass to vary the velocity of the stream of sealing compound being delivered through the orifice.

Another object of the invention is to provide an applicator nozzle structure of the character stated wherein the plow spreader portion is in the form of a V for fitting into the hook in which sealing compound is being applied but which has a cross section more obtuse than the angle of the hook and dimensioned to engage in the hook in a manner for sealing off or limiting the width of sealing compound application in the hook.

A further object of the invention is to provide a nozzle structure of the character stated wherein the sealing compound delivery orifice is disposed just in advance of the V-shaped plow in a clearance set back from the apex of the V, said clearance serving to provide an auxiliary reservoir during the application of sealing compound in a hook thereby to hold a blob of compound against a passing hook to be spread in uniform depth and width over the interior of the hook by the plow regardless of variations in the rate at which different portions of a given hook may be moved therepast during a sealing compound application.

A still further object of the invention is to provide a nozzle structure of the character stated wherein there is included a slotway through which the angle bent edge portions in part defining the outer hooks of the can bodies may pass in a manner providing for application of sealing compound not only on the inner face of each said angle bent edge portion and the body blank portion opposing it in the hook V relation, but also on at least a portion of the outwardly or downwardly directed face of each said angle bent edge portion.

With the above and other objects in view that will hereinafter appear, the nature of the invention will be more fully understood by following the detailed description, the appended claims and the several views illustrated in the accompanying drawings.

In the drawings:

Figure 4 is an enlarged fragmentary perspective view illustrating the positioning of the sealing compound applying nozzle, the stream shield as well as the blank clamp and its actuating rocker being removed.

Figure 5 is a somewhat diagrammatic side elevation illustrating the means for imparting reciprocatory movement to the can body blank feeder bars.

Figure 6 is a somewhat diagrammatic plan view illustrating a can body blank hook starting over the nozzle and having sealing compound applied and accurately distributed therein.

Figure 7 is an enlarged end elevation illustrating the engagement of the plow nozzle in a can body blank hook, the manner of accurately placing the sealing compound and effecting sealing contact for determining the limits of the application being clearly shown.

Figure 8 is a sectional view similar to Figure 7 illustrating a slightly modified form of nozzle wherein the compound application limiting seal is in part provided by a wear surface enlargement.

Figure 9 is a sectional view similar to Figure 7 illustrating another slightly modified form of nozzle wherein provision is made for applying sealing compound to a portion of the outside of a hook as well as the inside.

Figure 10 is a view showing the modified nozzle of Figure 9 in end elevation and clearly illustrating the slotway through which the hooks are permitted to pass.

Figure 11 is a vertical cross section taken through the sealing compound applying apparatus along the center of the nozzle supply duct and return trough and looking in the direction in which the can body blanks are fed.

Figure 12 is a vertical longitudinal section taken through the sealing compound reservoir along the axis of the pump drive shaft and looking toward the by-pass control valve and the sealing compound return trough.

Figure 13 is a detail plan view illustrating a can body blank adapted for the making of a can body of the lock and lap seam type.

Figure 14 is a wiring diagram illustrating one manner of electrically connecting the heating elements and the controlling thermostats.

Figure 15 is a plan view illustrating the sealing compound applying apparatus, the nozzle structure being removed.

In the example of embodiment of the invention herein disclosed the novel sealing compound applying apparatus is shown as incorporated in a can body maker of the well known Troyer-Fox hereinbefore referred to, the same being mounted immediately ahead of the arch under which the can bodies are shaped about the horn or immediately beyond the second folding station whereat the folding of the outside hook is completed.

Figure 2:
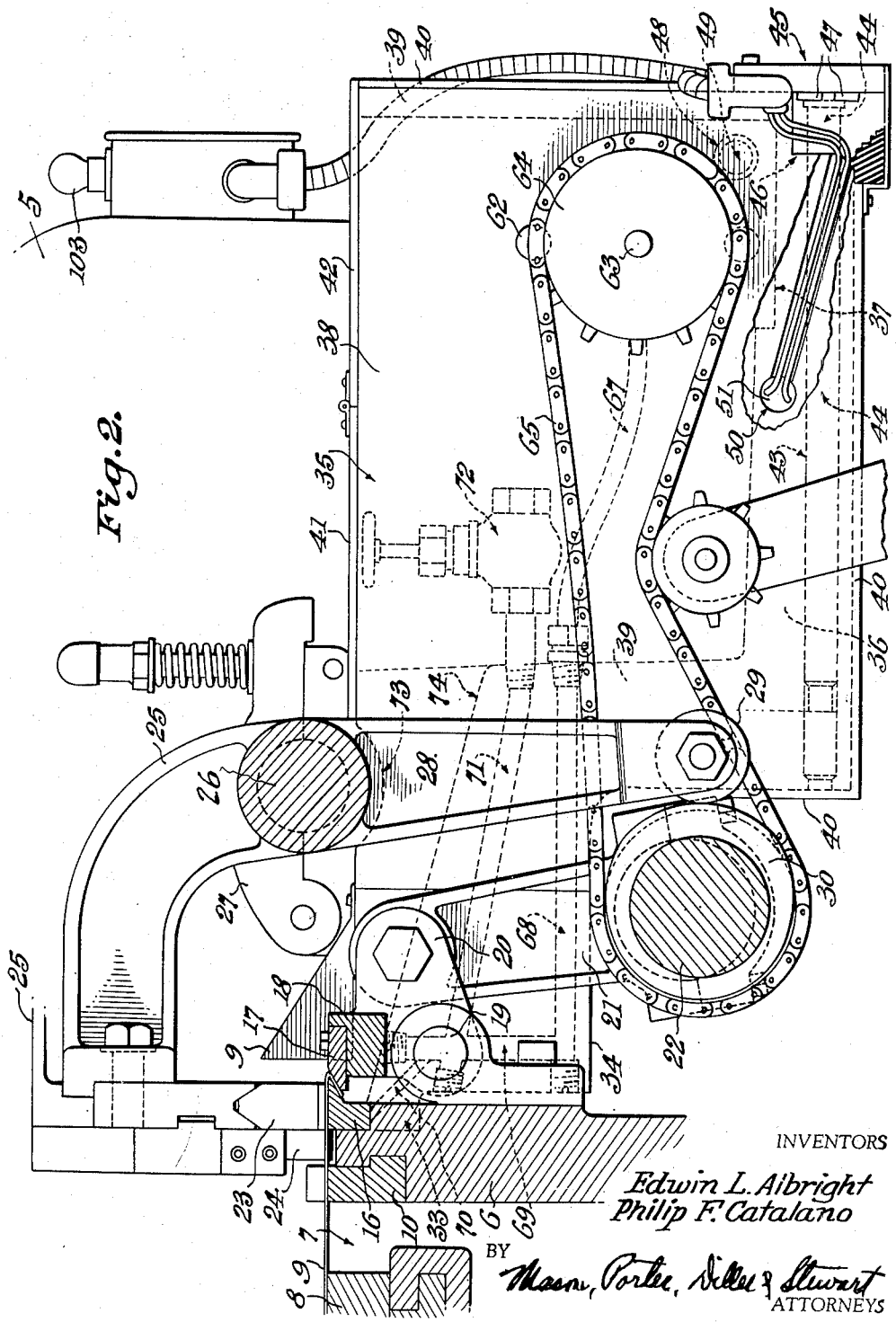
Figure 2 is a vertical cross section taken on the line 2—2 on Figure 1.
Figure 3:
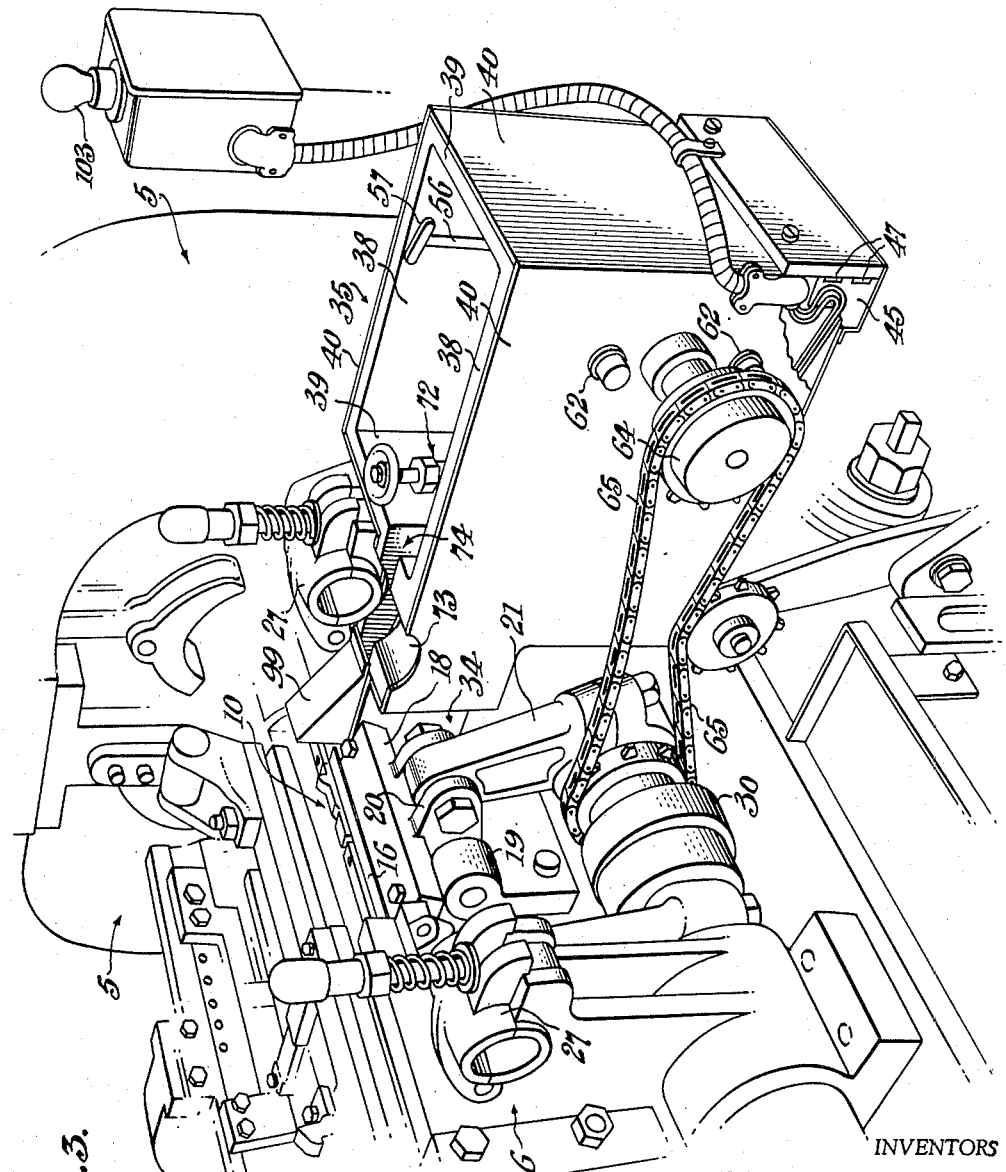
Figure 3 is a perspective view illustrating the sealing compound applying apparatus and a portion of the can body maker on which it is mounted, the adjacent blank clamp and stop assembly and its actuating rocker being omitted to show the location of the sealing compound stream shield immediately beyond the oscillatable hook folder.

Of the conventional body maker parts shown fragmentarily herein to illustrate the environment of the invention the arch is indicated at 5, and the right-hand housing at 6. The feedway generally designated 7 and including the central support 8 over which the can body blanks 9 are fed by the reciprocating feed bars 10 is best shown in Figures 2 and 3 of the drawings. The reciprocating feed drive is well known in the art and is somewhat diagrammatically illustrated in Figure 5. This feed means includes the crank disc 11 the crank pin of which is pitman connected at 12 to the lower end of the rocking lever means 13 which is pivotally mounted intermediate its ends on the frame structure and has its upper end link connected at 14 to the cross head 15 to which the feed bars are attached. It is well known that this type of drive means imparts an harmonic motion to the feed bars because of the transferring of the rotary movement of the crank pin into the straight line reciprocatory movement of the feed bars, there being a relatively rapid movement over the mid-portion of each feed stroke, a gradually accelerating movement at the start of each feed stroke and a gradually decelerating movement toward the end of each feed stroke.

In the well known Troyer-Fox machine the can body blanks are fed along step by step through several work stations at which different steps in the process of can body making are performed. Among these steps are the well known notching, slitting and hook forming operations. The hook forming operations are performed in two stages, a first bending of the longitudinally extending and edge portions of the blanks vertically out of the horizontal plane in which they are fed, and a second bending laterally at a second folding station and to the proper angular relation of the hooks. The final folding of the hooks at the second folding station is illustrated in Figure 2 from which it will be apparent that the right-hand housing 6 carries a forming steel 16 over which the perpendicularly downwardly turned edge of the blank extends to be engaged and folded by a folding steel 17 carried on the oscillatable folder 18, which is rockably mounted at 19. The illustrated folder 18 has a crank extension 20 which is pitman connected at 21 with a driving eccentric mounted on the cam shaft 22. This manner of folding the hooks so that they will bear angular relation to the main body of the blanks, or cooperate therewith in forming a V, is well known in the art, and the well known blank clamp and blank stop assembly 23, 24, is illustrated in this disclosure of conventional body maker parts. The blank clamp 23 and the blank stop 24 are carried by the usual arms 25 extending from the rocker 26 which is rockably mounted in the bearings 27. An actuator arm 28 depends from the rocker and carries the usual follower roller 29 at its lower bifurcated end, said roller being engaged with the actuator cam 30 on the cam shaft 22. The construction and operation of the body maker parts thus far described being so well known in the art it is deemed unnecessary to dwell at greater length with these parts.

A clearance 31 is provided in the right-hand housing structure 6 just beyond the second folding station, as indicated in Figure 4, and in this clearance is mounted the sealing compound applying nozzle structure generally designated 32 and which is to be described in detail hereinafter. The nozzle structure is removably mounted on the shelf 33 provided on the extension 34 from the sealing compound reservoir structure generally designated 35.

The reservoir structure preferably comprises a heavy aluminum casting including a thick bottom 36 inclined toward a depressed portion or recess 37 at one end thereof. There are also included upstanding sides 38 arranged transversely with relation to the direction of feed movement of the blanks, and end walls 39 extending longitudinally or parallel the line of feed movement of the blank. The reservoir walls preferably are faced with removably mounted transite insulating plates 40, and the otherwise open top of the reservoir has a portion thereof closed by a transite plate 41 removably mounted thereon, and the remainder thereof closed by a hinged cover 42.

The reservoir base 36 is equipped with a plurality of parallel bores 43 in which to removably receive electrical resistance heater units 44 projecting from a carrier 45 which is removably secured in a receiving recess 46 provided in the outwardly and downwardly directed corner formed at the juncture of the base 36 and one of the end walls 39. The carrier 45 may have buss bars 47 embedded therein in order to facilitate electrical connection of the heater units and the connection of said units in the control circuit as diagrammatically indicated in Figure 14.

A tap 48 is provided in one side wall 38 just above the base of the reservoir, and in this tap is removably mounted an adjustable thermostat 49 which serves as the main control effective to maintain the desired temperature of the sealing compound within the reservoir, this temperature preferably approximating 275° F. Another cross bore 50 is provided in the base 36 above the heater mounting bores and serves as a mounting for the burn-out preventing or safety thermostat 51 which is set to automatically break the circuit and discontinue application of heat by the heating units at a safety temperature somewhat above the normal control temperature maintained by the beforementioned variable thermostat 49. Thus the thermostat 49 will maintain the temperature desired in the sealing compound within the reservoir, but should this thermostat fail for any reason, the auxiliary or safety thermostat 51 will break the circuit in order to prevent improper heating by the battery of the heating units 44.

Figure 1:
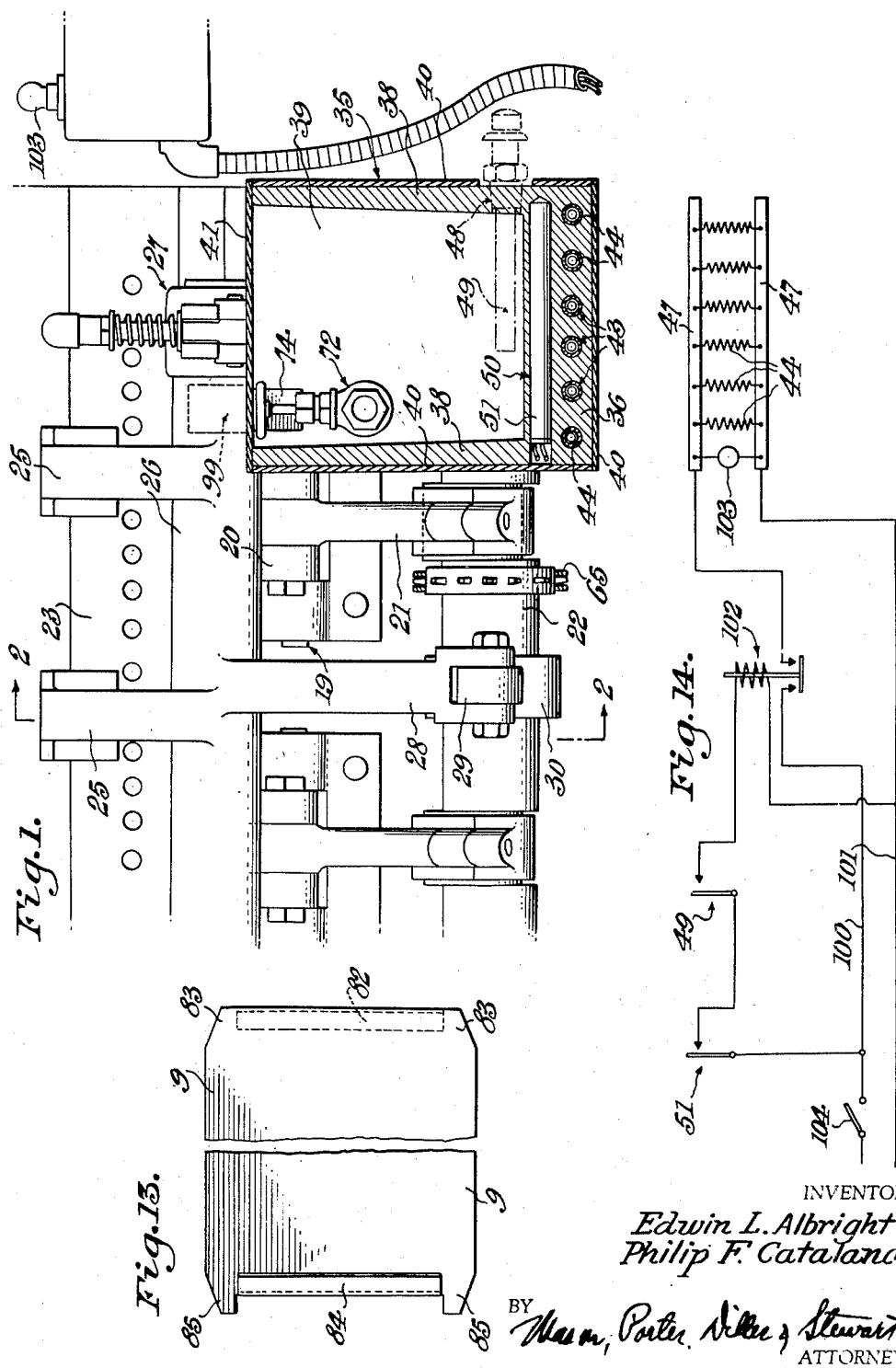
Figure 1 is a fragmentary side elevation of a portion of a can body maker with the invention applied thereon, parts being broken away and in section.

A cylindrical strainer 52 is threadably mounted at 53 on a bracket 54 secured at 55 on the reservoir base, and this strainer has an upstanding rod 56 to which a handle 57 is attached so as to facilitate mounting and removal of the strainer. A suction duct 58 connects at one end with the bracket port 59 and at its other end to the intake 60 of a continuously driven gear pump 61 of any approved form and which is secured at 62 on one of the reservoir side walls 38. The drive shaft 63 of the pump is extended through the adjacent side wall and is equipped with a driver sprocket 64 having chain and sprocket connection at 65 with the cam shaft 22 so as to be driven therefrom. See Figures 1 and 2. The delivery port 66 of the pump is connected by a duct 67 with the horizontal supply bore 68 provided in the extension 34, and the bore 68 in turn connects with the vertical bore 69 delivering into the bore 70 leading to the nozzle structure. A by-pass or return bore 71 is provided in the extension 34 above the supply bore 68, and this bore 71 communicates at one end with the vertical bore 69 and delivers at its other end into the reservoir through an adjustable globe valve 72. By adjusting the valve 72 a greater or lesser choking of free passage of sealing compound can be provided in the by-pass communication 68, 69 and 71, and by this means the velocity of the sealing compound passing through the nozzle serving bore 70 can be varied at will.

The reservoir extension 34 also is equipped with a recess 73 to clear the clamp rocker 26 and has a trough 74 formed therein and sloping downwardly from the position of the shelf 33 to a point at which it delivers sealing compound received therein back into the reservoir.

The nozzle structure generally designated 32 includes a body 75 which is removably supported on the extension shelf 33 and which includes a V-shaped plow extension 76 dimensioned to generally conform to and fit in the body blank hooks in the manner clearly illustrated in Figures 6 and 7 of the drawings. It will be noted that the V cross section of the plow 76 is more obtuse than the V of the body blank hook portions into which it extends and by this means is caused to engage the blank body at 77 and the hook at 78 in a manner serving as a dam means effective to limit spreading of applied sealing compound outwardly beyond said points of contact. The nozzle structure includes a hollow chamber or duct 79 in the body 75 and leading to the orifice 80 which opens into a clearance or recess 81 cut back from the apex of the plow in a manner clearly illustrated in Figures 6 and 7. It will be apparent by reference to Figure 6 that as each can body blank travels past the nozzle structure in the direction indicated by the arrow, the hook portion thereof will first encounter the orifice 80 and have sealing compound applied therein, and immediately thereafter the plow 76 will engage the applied sealing compound and very evenly and smoothly distribute the same throughout the full length of the hook. It will also be apparent that by reason of the provision of the clearance or recess 81 in the nozzle structure, during each passing of a body blank hook a blob or quanity of sealing compound will be retained in the clearance and against the hook to provide an adequate supply of sealing compound for being uniformly spread throughout the full length of the hook by the plow 76. This always adequate and uniform application and distribution of sealing compound will pertain regardless of whether the body blanks are being fed by the non-uniform harmonic motion previously described or otherwise. A body blank of the lock and lap seam type is illustrated in Figure 13, and by reference to this figure and to the beforementioned Figure 6 it will be apparent that the nozzle orifice 80 is so positioned that it will not only be effective to deliver the sealing compound into the outer hook 82, but also on the lap portions 83 associated with the outer hook. The blank illustrated in Figure 13 includes the usual inner hook 84 and the associated lap portions 85 which cooperate with the hook and lap portions 82, 83 in the well known manner in completing the can body side seam structure. Application of sealing compound to the hook and lap portions 82, 83 in the manner described will serve to assure the provision of a properly sealed seam without supplementary applications to the hook and lap portions 84 and 85.

A modified nozzle structure is illustrated in Figure 8, and this structure includes a wear surface 86 which cooperates with the angular surface 87 in defining the plow 88. This nozzle structure includes the same arrangement of clearance 89 and orifice 90 previously described, and it will be apparent by reference to Figure 8 that the wear surface 86 and the angular surface 87 contact the can body blank and its hook in the manner illustrated for serving as dam means limiting the application of the sealing compound in the manner previously described in connection with Figure 7.

Another modified nozzle structure is shown in Figures 9 and 10 wherein there is provided a slot 91 through which can body hooks may pass in position for splitting the orifice 92 and permitting the sealing compound to be applied not only interiorly of the hook but also exteriorly thereof as at 93. As in the case of the previously described nozzle structure, dam means are provided at 94 and 95 for limiting the application of the sealing compound.

The reservoir may have an auxiliary bracket extension 96 to permit accurately adjusted securing thereof at 97 to the housing 6, thereby to assure accurate placement of the nozzle structure with relation to the can body blank hooks being conveyed thereover so that the stream 98 of sealing compound delivered from the nozzle orifice in the manner clearly illustrated in Figure 4 will accurately engage in the hooks or squirt through the spaces intervening the can body blanks being fed in processional order and spaced relation into the trough 74 to be returned into the reservoir. Adjustment of the nozzle also can be resorted to in order accurately to determine the thickness of the applied film of sealing compound.

A shield 99 is mounted over the trough so as to prevent uncontrolled squirting of the stream of sealing compound at any time at which the globe valve 72 may have been improperly adjusted so as to cause delivery of the sealing compound from the nozzle at too great a velocity.

In the wiring diagram shown in Figure 14 the connection of the resistance heater units and the controlling thermostats in the control circuits is illustrated. The thermostats 49 and 51 preferably are connected with the service lines 100 and 101 serving the heaters 44 through a relay 102, thereby minimizing the current passing through the control thermostats. A signal lamp 103 may be connected in the circuit in the manner illustrated so as to make it apparent to an operator when the heater units are functioning. It will be apparent by reference to Figure 14 that whenever the master switch 104 is closed and both of the thermostats 49 and 51 are demanding heat, the relay 102 will be energized to complete the circuit, light the signal light 103 and energize the heater units 44 so as to bring about the heating of the sealing compound in the reservoir. Whenever the sealing compound is heated to the predetermined temperature controlled by the thermostat 49, said thermostat will break the circuit to the relay and the relay will break the circuit and discontinue the supplying of current to the heater units 44. Each time the temperature of the sealing compound again drops below the predetermined temperature the relay circuit will again be closed and the energizing of the relay will serve to close the circuit through the heater units 44. As before stated, should the temperature of the sealing compound rise above the predetermined maximum controlled by the thermostat 51, the latter will break the circuit in the manner previously described to discontinue the supplying of current to the heater units 44.

In the operation of the apparatus the can body blanks being fed in processional order and is spaced relation will have sealing compound applied in and uniformly distributed over the outer hook and lap portions in the manner previously described, the stream 98 of sealing compound clearly illustrated in Figure 4 passing outwardly between the traveling blanks and returning to the reservoir through the trough 74. The pump 61 constantly maintains the adjusted velocity of the stream 98 and this velocity can be varied at will by controlling the by-passing of the sealing compound through the medium of the globe valve 72 as previously described.

The herein described sealing compound applying apparatus not only serves to apply the sealing compound more adequately and uniformly than it can be applied by other known devices, but said apparatus requires a minimum of attention and maintenance, is substantially fool proof, and its operation is attended by very little if any inefficient application of sealing compound to body maker parts.

While example structures embodying the invention are shown and described herein it is to be understood that variations in these structures may be made without departing from the spirit and scope of the invention as defined in the appended claims.

We claim:

1. In apparatus of the character described, a sealing compound distributing plow, means for placing a can body blank with a longitudinal seam hook thereon having a sealing compound applied therein in accurate cooperative relation to said plow for having the plow engage the sealing compound within the hook, and means for bringing about relative movement along a straight line between said plow and said hook with the plow extending into and engaging in the hook while said accurate cooperative relation is maintained for causing the plow to distribute the sealing compound evenly throughout the whole length of the hook.

2. In apparatus of the character described, a sealing compound distributing plow, means for placing a can body blank having a longitudinal seam hook thereon in position for having the plow project into the hook, means for applying a sealing compound in the hook in advance of the plow, and means for bringing about relative movement along a straight line between said plow and said hook while maintaining the projection of the plow into the hook for causing the plow to distribute the sealing compound evenly throughout the whole length of the hook.

3. Apparatus as defined in claim 2 wherein the sealing compound applying means includes a nozzle structure of which the plow forms a part, said nozzle structure including an orifice bearing a predetermined definite and fixed relation to the plow and through which sealing compound is directed into the hook, the orifice being disposed endwise of the plow along the line of relative movement so that as the plow and hook are moved relatively the orifice will apply the sealing compound and the plow will follow up and accurately distribute the same in the hook.

4. Apparatus as defined in claim 2 wherein the sealing compound applying means includes a nozzle structure of which the plow forms a part, said nozzle structure including an orifice bearing a predetermined definite and fixed relation to the plow and through which sealing compound is directed into the hook, said hook comprising an end edge of the body blank bent into angular relation to the blank body to form a V, the plow being V-shaped in cross section to fit into the hook V and the orifice being disposed in an edge clearance disposed endwise of and spaced back from the apex of the plow V to form a clearance into which the sealing compound is delivered through the orifice so that a blob of sealing compound will be applied in said clearance and as the plow and hook are moved relatively the plow will follow up and accurately distribute the applied sealing compound in the hook.

5. In apparatus of the character described, a sealing compound distributing plow, means for placing a can body blank having a longitudinal seam hook thereon in position for having the plow project into the hook, means for applying a sealing compound in the hook in advance of the plow, and means for bringing about relative movement along a straight line between said plow and said hook while maintaining the projection of the plow into the hook for causing the plow to accurately distribute the sealing compound evenly throughout the whole length of the hook, said hook comprising an end edge of the body blank bent into angular relation to the blank body to form a V, the plow being V-shaped in cross section but more obtuse than the V-section at the hook and body juncture whereby portions of the plow V will engage with portions of the hook and blank body as a dam means limiting spreading of the sealing compound outwardly away from the hook V apex.

6. In apparatus of the character described, a sealing compound distributing plow, means for placing a can body blank having a longitudinal seam hook thereon in position for having the plow project into the hook, means for applying a sealing compound in the hook in advance of the plow, and means for bringing about relative movement along a straight line between said plow and said hook while maintaining the projection of the plow into the hook for causing the plow to accurately distribute the sealing compound evenly throughout the whole length of the hook, said hook comprising an end edge of the body blank bent into angular relation to the blank body to form a V, the plow being V-shaped in cross section but more obtuse than the V-section at the hook and body juncture and having a blank body engaging wear surface projected from a face thereof in part defining its V-section whereby said wear surface and a portion of the other face cooperatively converging to form the V-section engage with portions of the blank body and the hook as a dam means limiting spreading of the sealing compound outwardly away from the hook V apex.

7. In apparatus of the character described, means for feeding can body blanks each including a seam hook extending along an end edge in the direction of feed movement and comprising an edge bent into angular relation to the blank body to form a V, and a stationary V-shaped plow mounted in position for extending a predetermined definite distance into each hook V as it is moved therepast for distributing sealing compound applied to said V evenly throughout the full length of the travelling hook.

8. In apparatus of the character described, means for feeding can body blanks each including a seam hook extending along an end edge in the direction of feed movement and comprising an edge bent into angular relation to the blank body to form a V, means for applying a sealing compound into each hook V as it is moved along, and a stationary V-shaped plow mounted in position for extending a predetermined definite distance into each hook V as it is moved therepast for distributing sealing compound applied in said V evenly throughout the full length of the travelling hook.

9. Apparatus as defined in claim 8 wherein the sealing compound applying means includes a nozzle structure of which the plow forms a part, said nozzle structure including an orifice bearing a predetermined definite and fixed relation to the plow and through which sealing compound is directed into the hook, the orifice being disposed endwise of the plow along the line of relative movement so that as the plow and hook are moved relatively the orifice will apply the sealing compound and the plow will follow up and accurately distribute the same in the hook.

10. Apparatus as defined in claim 8 wherein the sealing compound applying means includes a nozzle structure of which the plow forms a part, said nozzle structure including an orifice bearing a predetermined definite and fixed relation to the plow and through which sealing compound is directed into the hook, the orifice being disposed endwise of the plow along the line of relative movement so that as the plow and hook are moved relatively the orifice will apply the sealing compound and the plow will follow up and accurately distribute the same in the hook, the plow being V-shaped in cross section but more obtuse than the V-section at the hook and body juncture whereby portions of the plow V will engage with portions of the hook and blank body as a dam means limiting spreading of the sealing compound outwardly away from the hook V apex.

11. Apparatus as defined in claim 8 wherein the sealing compound applying means includes a nozzle structure of which the plow forms a part, said nozzle structure including an orifice bearing a predetermined definite and fixed relation to the plow and through which sealing compound is directed into the hook, the orifice being disposed endwise of the plow along the line of relative movement so that as the plow and hook are moved relatively the orifice will apply the sealing compound and the plow will follow up and accurately distribute the same in the hook, the plow being V-shaped in cross section but more obtuse than the V-section at the hook and body juncture and having a blank body engaging wear surface projected from a face thereof in part defining its V-section whereby said wear surface and a portion of the other face cooperatively converging to form the V-section engage with portions of the blank body and the hook as a dam means limiting spreading of the sealing compound outwardly away from the hook V apex.

12. Apparatus as defined in claim 8 wherein the sealing compound applying means includes a nozzle structure of which the plow forms a part, said nozzle structure including an orifice bearing a predetermined definite and fixed relation to the plow and through which sealing compound is directed into the hook, the orifice being disposed endwise of the plow along the line of relative movement so that as the hook is moved past the nozzle structure the orifice will apply the sealing compound and the plow will follow up and accurately distribute the same in the hook, and said nozzle structure having a slot opposite the orifice through which a portion of each hook passes and a clearance directing sealing compound onto an outer face portion of each said hook.

13. In apparatus of the character described, means for feeding can body blanks in processional order and in equidistantly spaced relation, each said blank including a seam hook extending along an end edge in the direction of feed movement and comprising an edge bent into angular relation to the blank body to form a V, a reservoir, means for maintaining a hot melt sealing compound in fluid state therein, means for continuously directing a stream of the sealing compound across the path of travelling seam hooks so that sealing compound will be applied in each seam hook throughout the whole length thereof, and means for receiving sealing compound directed through the spaces between travelling seam hooks and returning the same to the reservoir.

14. Apparatus as defined in claim 13 wherein is included a spreader element projecting into and engageable in each passing seam hook for evenly distributing the sealing compound applied therein throughout the full length of the hook.

15. Apparatus as defined in claim 13 wherein is included a spreader element engageable in each passing seam hook for evenly distributing the sealing compound applied therein throughout the full length of the hook, said spreader element being in the form of a V-shaped plow conforming generally to the shape of each hook V.

16. Apparatus as defined in claim 13 wherein is included a spreader element engageable in each passing seam hook for evenly distributing the sealing compound applied therein throughout the full length of the hook, said spreader element being in the form of a V-shaped plow conforming generally to the shape of each hook V and including blank body and hook engaging portions serving as dam means effective to limit spreading of the applied sealing compound outwardly from the V apex.

17. Apparatus as defined in claim 13 wherein the sealing compound directing means includes a delivery duct having connection with a force pump in the reservoir and with a by-pass duct returning to the reservoir, and there being included means for variably choking said by-pass duct to vary the velocity of the stream of sealing compound delivered through the delivery duct.

18. Apparatus as defined in claim 13 wherein the sealing compound directing means includes a delivery duct having connection with a force pump in the reservoir, and wherein the means for returning sealing compound to the reservoir comprises a catch trough disposed to receive the sealing compound stream and direct it back into the reservoir, said pump having a screened inlet in the reservoir.

19. Apparatus as defined in claim 13 wherein the sealing compound directing means includes a delivery duct having connection with a force pump in the reservoir, and wherein the means for returning sealing compound to the reservoir comprises a catch trough disposed to receive the sealing compound stream and direct it back into the reservoir, said pump having a screened inlet in the reservoir, and there being included a by-pass duct communicating with the delivery duct and returning to the reservoir, and means for variably choking said by-pass duct to vary the velocity of the stream of sealing compound delivered through the delivery duct, and shielding means overlying the return trough and serving to assure return of the stream of sealing compound into the trough.

20. Apparatus as defined in claim 13 wherein the sealing compound directing means includes nozzle structure having an orifice through which the sealing compound is directed and a plow disposed endwise of the orifice and V-shaped to fit into the passing hooks and evenly distribute the sealing compound applied therein through the orifice, said orifice being disposed in an edge clearance in the nozzle structure spaced back from the apex of the plow V to form a clearance in which a blob of sealing compound being discharged through the orifice will be held against the opposing portion of a passing hook to be engaged and evenly distributed in the hook by the plow.

21. The herein described method of applying sealing compound in the hook portions of the body blanks, said method comprising feeding the blanks along a predetermined path with their hook flanges disposed downwardly and longitudinally of said path, injecting an over-abundant quantity of sealing compound into the zone defined by the hook flange bight and contiguous portion of each blank, and plowing out surplus compound from said zone to leave in said hook a deposit of predetermined shape conforming generally to the opposing hook and contiguous body portions.

References Cited in the file of this patent

UNITED STATES PATENTS

| | | |
|---|---|---|
| 1,085,566 | Glover | Jan. 27, 1914 |
| 1,180,661 | Kruse | Apr. 25, 1916 |
| 2,093,422 | Diamond et al. | Sept. 21, 1937 |
| 2,293,252 | Foster et al. | Aug. 18, 1942 |
| 2,329,438 | Fiedler | Sept. 14, 1943 |
| 2,391,973 | Hunter | Jan. 1, 1946 |
| 2,469,392 | Jones et al. | May 10, 1949 |
| 2,522,324 | Wilkerson | Sept. 12, 1950 |